United States Patent
Wang

(10) Patent No.: US 6,795,720 B2
(45) Date of Patent: Sep. 21, 2004

(54) HIGH TEMPERATURE SUPERCONDUCTING SYNCHRONOUS ROTOR COIL HAVING MULTI-PIECE ROTOR CORE

(75) Inventor: Yu Wang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 51 days.

(21) Appl. No.: 09/935,735

(22) Filed: Aug. 24, 2001

(65) Prior Publication Data

US 2003/0038560 A1 Feb. 27, 2003

(51) Int. Cl.⁷ .................. H02K 55/00; H02K 55/02; H02K 55/04
(52) U.S. Cl. .............. 505/166; 310/52; 310/54; 310/55; 310/58; 310/179; 310/214; 310/270
(58) Field of Search ............... 310/52–56, 58, 310/216, 261, 179, 214, 270; 505/166

(56) References Cited

U.S. PATENT DOCUMENTS

| | | | |
|---|---|---|---|
| 3,942,053 A | * | 3/1976 | Abolins et al. ............ 310/52 |
| 3,983,427 A | * | 9/1976 | Ulke ........................ 310/61 |
| 3,991,333 A | * | 11/1976 | Laskaris ................... 310/52 |
| 4,315,172 A | * | 2/1982 | Intichar et al. ........... 310/53 |
| 5,296,773 A | * | 3/1994 | El-Antably et al. ..... 310/261 |
| 5,532,663 A | | 7/1996 | Herd et al. |
| 5,548,168 A | | 8/1996 | Laskaris et al. ........... 310/52 |
| 5,672,921 A | | 9/1997 | Herd et al. |
| 5,774,032 A | | 6/1998 | Herd et al. ................ 335/216 |
| 5,777,420 A | | 7/1998 | Gamble et al. ............ 310/91 |
| 5,798,678 A | | 8/1998 | Manlief et al. |
| 5,953,224 A | | 9/1999 | Gold et al. |
| 6,066,906 A | | 5/2000 | Kalsi |
| 6,140,719 A | | 10/2000 | Kalsi ....................... 310/261 |
| 6,169,353 B1 | * | 1/2001 | Driscoll et al. .......... 310/261 |
| 6,173,577 B1 | | 1/2001 | Gold |
| 6,570,292 B2 | * | 5/2003 | Wang et al. ............. 310/214 |
| 6,590,308 B2 | * | 7/2003 | Dawson et al. .......... 310/162 |
| 2002/0125787 A1 | | 9/2002 | Howard et al. |
| 2003/0011253 A1 | | 1/2003 | Kalsi et al. |
| 2003/0011273 A1 | | 1/2003 | Kalsi et al. |
| 2003/0011452 A1 | | 1/2003 | Snitchler et al. |

OTHER PUBLICATIONS

Fast, Reactive Power Support, *HTS Generators*, American Superconductor™(Feb. 27, 2001)pp. 1–4.

* cited by examiner

Primary Examiner—Thanh Lam
Assistant Examiner—David W. Scheuermann
(74) Attorney, Agent, or Firm—Nixon & Vanderhye P.C.

(57) ABSTRACT

A rotor for a synchronous machine comprising: a superconducting field winding assembly having a coil winding and at least one winding support extending between opposite sides of the winding, and a rotor core formed of a plurality of rotor core sections, each of said core sections having a tension bar slot to receive said at least one tension bar.

32 Claims, 4 Drawing Sheets

HIGH TEMPERATURE SUPERCONDUCTING SYNCHRONOUS ROTOR COIL HAVING MULTI-PIECE ROTOR CORE

BACKGROUND OF THE INVENTION

The present invention relates generally to a superconductive field coil winding in a synchronous rotating machine. More particularly, the present invention relates to a rotor core that supports a superconducting field winding assembly in a synchronous machine.

Synchronous electrical machines having rotor field coil windings include, but are not limited to, rotary generators, rotary motors, and linear motors. These machines generally comprise a stator and rotor that are electromagnetically coupled. The rotor may include a multi-pole rotor core and one or more field coil windings mounted on the rotor core. The rotor cores may include a magnetically-permeable solid material, such as an iron-core rotor.

Conventional copper windings are commonly used in the rotors of synchronous electrical machines. However, the electrical resistance of copper windings (although low by conventional measures) is sufficient to contribute to substantial heating of the rotor and to diminish the power efficiency of the machine. Recently, superconducting (SC) field coil windings have been developed for rotors. SC windings have effectively no resistance and are highly advantageous rotor coil windings.

Iron-core rotors saturate at an air-gap magnetic field strength of about 2 Tesla. Known superconductive rotors employ air-core designs, with no iron in the rotor, to achieve air-gap magnetic fields of 3 Tesla or higher. These high air-gap magnetic fields yield increased power densities of the electrical machine, and result in significant reduction in weight and size of the machine. Air-core superconductive rotors require large amounts of superconducting wire. The large amounts of SC wire add to the number of coils required, the complexity of the coil supports, and the cost of the SC coil windings and rotor.

High temperature SC rotor coil field windings are formed of superconducting materials that are brittle, and must be cooled to a temperature at or below a critical temperature, e.g., 27° K, to achieve and maintain superconductivity. The SC windings may be formed of a high temperature superconducting material, such as a BSCCO ($Bi_xSr_xCa_xCu_xO_x$) based conductor.

High temperature superconducting (HTS) coil windings are sensitive to degradation from high bending and tensile strains. These coils must undergo substantial centrifugal forces that stress and strain the coil windings. Normal operation of electrical machines involves thousands of start up and shut down cycles over the course of several years that result in low cycle fatigue loading of the rotor. Furthermore, the HTS rotor coil windings should be capable of withstanding 25% over-speed operation during rotor balancing procedures at ambient temperature, and at occasional over-speed conditions at cryogenic temperatures during power generation operation. These over-speed conditions substantially increase the centrifugal force loading on the rotor coil windings over normal operating conditions.

SC coils used as the HTS rotor field winding of an electrical machine are subjected to stresses and strains during cool-down and normal operation. These coils are subjected to centrifugal loading, torque transmission, and transient fault conditions. To withstand the forces, stresses, strains and cyclical loading, the SC coils should be properly supported in the rotor by a coil support system. These coil support systems hold the SC coil(s) in the HTS rotor and secure the coils against the tremendous centrifugal forces due to the rotation of the rotor. Moreover, the coil support system protects the SC coils, and ensures that the coils do not prematurely crack, fatigue or otherwise break.

Developing coil support systems for HTS coil has been a difficult challenge in adapting SC coil windings to HTS rotors. Examples of coil support systems for HTS rotors that have previously been proposed are disclosed in U.S. Pat. Nos. 5,548,168; 5,532,663; 5,672,921; 5,777,420; 6,169,353, and 6,066,906. However, these coil support systems suffer various problems, such as being expensive, complex and requiring an excessive number of components. There is a long-felt need for a HTS rotor having a coil support system for a SC coil. The need also exists for a coil support system made with low cost and easy to fabricate components.

BRIEF SUMMARY OF THE INVENTION

A multi-piece rotor core for a superconducting synchronous machine has been developed. The rotor core includes passages transverse to the rotor axis. Through these passages extend coil support bars that are coupled to a superconducting coil winding. The coil winding extends around the rotor core, and is generally in a plane that includes the rotor axis. The rotor core has flat sides that are adjacent the long sides of the coil winding.

The rotor core is assembled from several rotor core sections. These sections are generally disk shaped and have a T-shaped cross-section. The rotor core sections have connection bosses to engage slots in adjacent rotor core sections. The core sections are assembled around a pre-formed superconducting winding and coil support. The assembly of rotor core sections form a solid core, except for the support bar passages that extend through the core axis. The core sections are held together by tie rods that extend through the assembly of sections. The rods are parallel to the rotor core axis and extend the length of the core.

Tension bars that extend between the sides of the rotor coil can provide support so that the coil will withstand the centrifugal forces of the rotor. To support opposite sides of the coil, the tension bars extend through rotor core. There is a desire to assembly the tension bar and coil winding before both are mounted on a rotor core. However, a solid rotor core will not allow for pre-assembly of the coil and tension members. Thus, there is a need for a rotor core and assembly technique that will allow an assembled coil and tension member to be mounted on a solid rotor core.

An assembly of rotor core sections permits the rotor core to be assembled around a coil winding assembly. The coil winding assembly may be assembled with the winding support to form a pre-formed coil winding assembly prior to the rotor core assembly. Pre-assembly of the field coil and winding support should reduce the rotor-coil production cycle, improve coil support quality, and reduce coil assembly variations.

The HTS rotor may be for a synchronous machine originally designed to include SC coils. Alternatively, the HTS rotor may replace a copper coil rotor in an existing electrical machine, such as in a conventional generator. The rotor and its SC coils are described here in the context of a generator, but the HTS coil rotor is also suitable for use in other synchronous machines.

In a first embodiment, the invention is a rotor in a synchronous machine, comprising: a superconducting field winding assembly having a coil winding and at least one winding support extending between opposite sides of the winding, and a rotor core formed of a plurality of rotor core sections, each of said core sections having a slot to receive said winding support.

In another embodiment, the invention is a rotor core and winding assembly comprising: separable rotor core sections assembled around the winding assembly to form said rotor core, where said core sections are axially aligned with said rotor core, and said winding assembly includes a pre-assembled a superconducting field winding and a center winding support.

Another embodiment of the invention is a method for assembling a rotor core around a superconducting field coil winding assembly comprising the steps of: fabricating said field coil winding assembly by assembling a field coil winding and a coil support prior to assembly of the rotor core, inserting a portion of each of a plurality of rotor core sections partially through said coil winding assembly, assembling the plurality of rotor core sections around said coil support, and securing the assembly of rotor core sections.

BRIEF DESCRIPTION OF THE DRAWINGS

The accompanying drawings in conjunction with the text of this specification describe an embodiment of the invention.

DETAILED DESCRIPTION OF THE INVENTION

Figure 1:
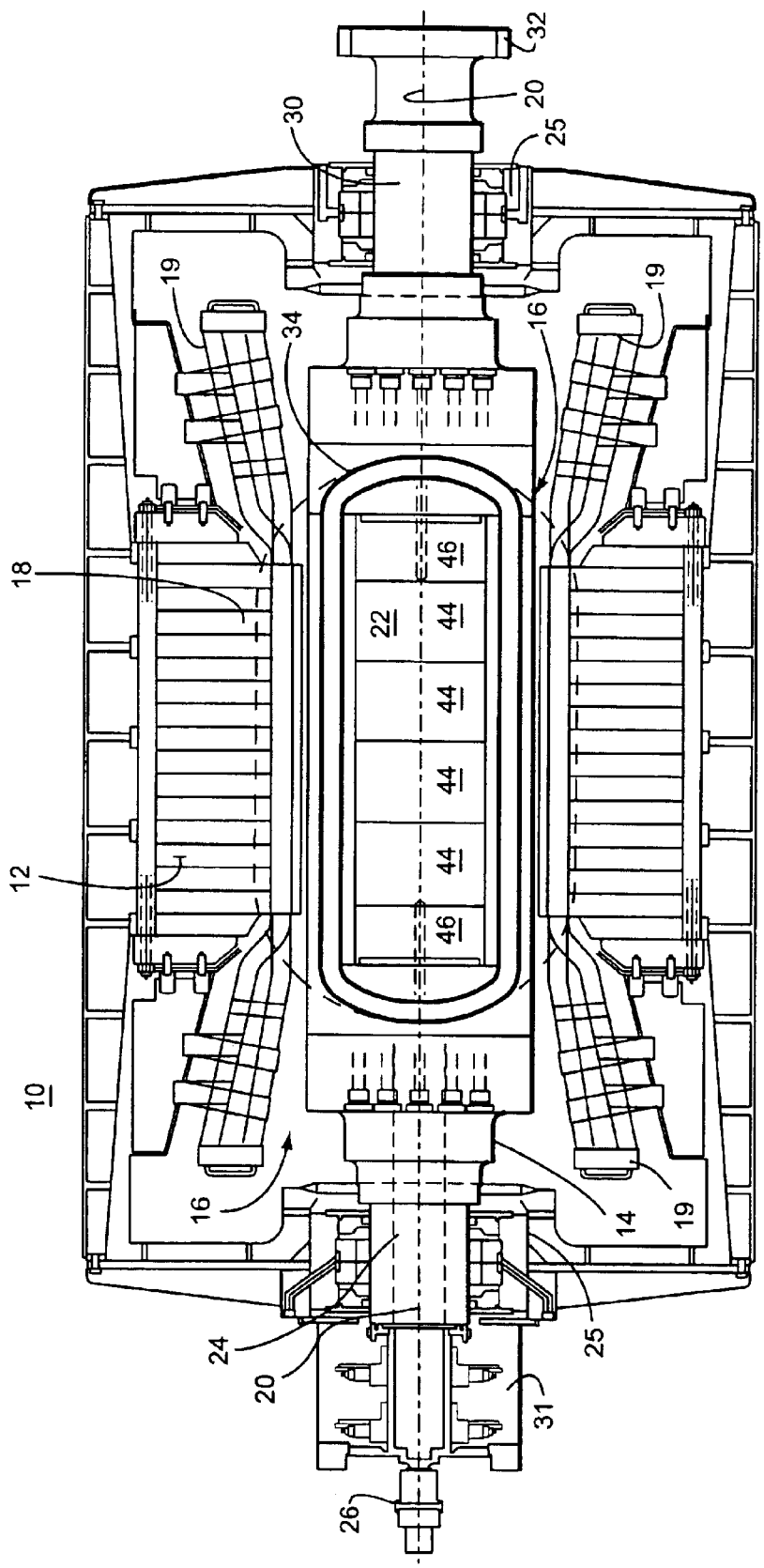
FIG. 1 is a schematic side elevational view of a synchronous electrical machine having a superconductive rotor and a stator.

FIG. 1 shows an exemplary synchronous generator machine 10 having a stator 12 and a rotor 14. The rotor includes field winding coils that fit inside the cylindrical rotor cavity 16 of the stator. The rotor fits inside the rotor cavity of the stator. As the rotor turns within the stator, a magnetic field 18 (illustrated by dotted lines) generated by the rotor and rotor coils moves/rotates through the stator and creates an electrical current in the windings of the stator coils 19. This current is output by the generator as electrical power.

The rotor 14 has a generally longitudinally-extending axis 20 and a generally solid, multi-piece rotor core 22. The rotor core is an assembly of axially-aligned end core sections 44 and middle core sections 46. The core 22 has high magnetic permeability, and is usually made of a ferromagnetic material, such as iron. In a low power density superconducting machine, the iron core of the rotor is used to reduce the magnetomotive force (MMF), and, thus, minimize the amount of superconducting (SC) coil wire needed for the coil winding.

Figure 2:
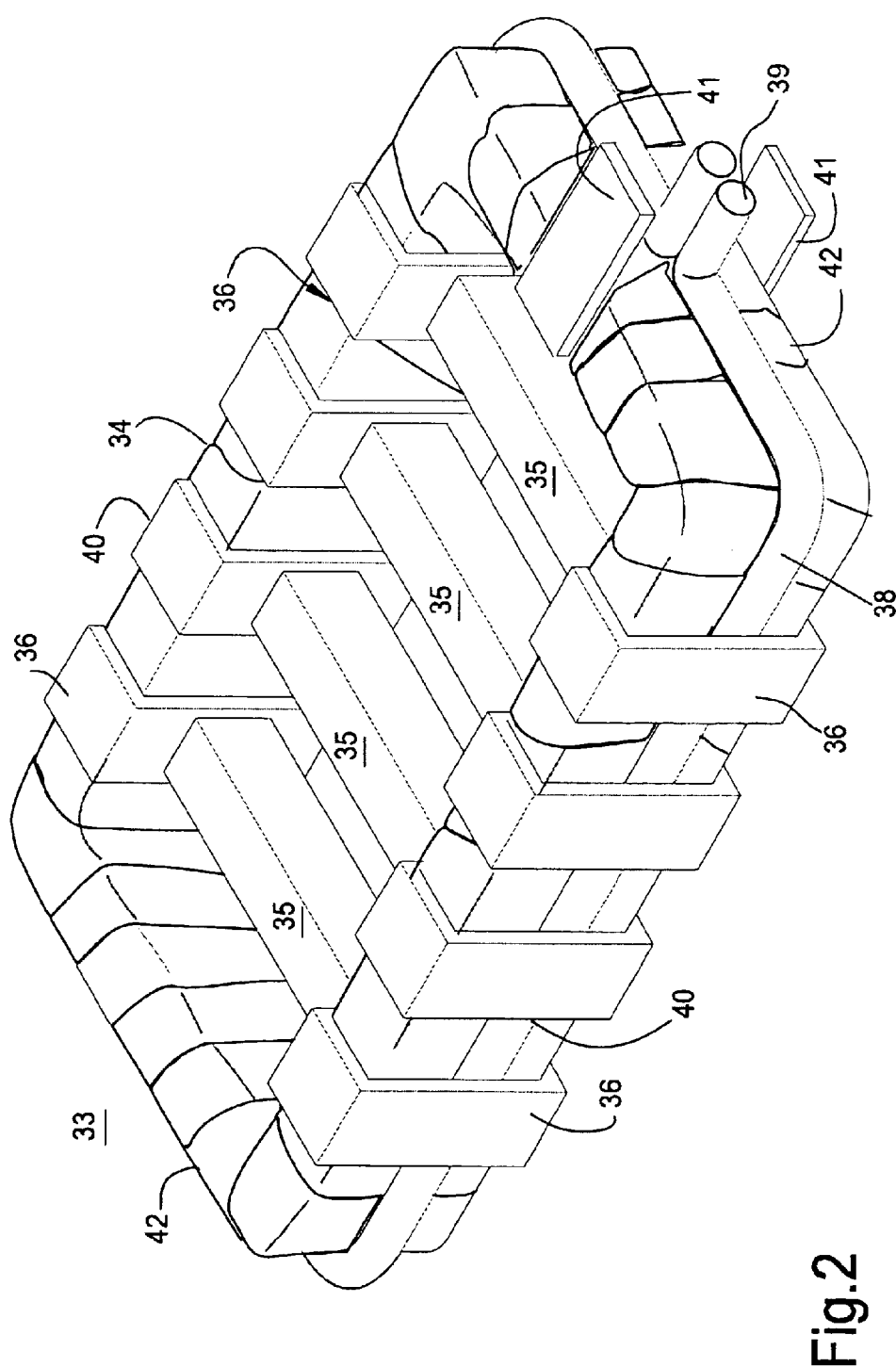
FIG. 2 is a perspective view of an exemplary racetrack superconducting coil winding.

The rotor 14 supports at least one longitudinally-extending, racetrack-shaped, high-temperature superconducting (HTS) field winding assembly 33 having an HTS winding (See FIG. 2). The HTS field coil winding may be alternatively a saddle-shape or have some other shape that is suitable for a particular HTS rotor design. A rotor field assembly and coil support is disclosed here for a racetrack SC field winding. The rotor core assembly and coil support may be adapted for winding configurations other than a racetrack field winding mounted on a solid rotor core.

The rotor includes a pair of end shafts 24, 30 that are supported by bearings 25. The end shafts may be coupled to external devices. For example, one of the end shafts 24 has a cryogen transfer coupling 26 to a source of cryogenic cooling fluid used to cool the SC field windings in the rotor. The cryogen transfer coupling 26 includes a stationary segment coupled to a source of cryogen cooling fluid and a rotating segment which provides cooling fluid to the HTS winding. This end 24 of the rotor may also include a collector 31 for electrically connecting to the rotating SC field winding. The opposite end shaft 30 of the rotor may be driven by a power turbine coupling 32.

Figure 8:
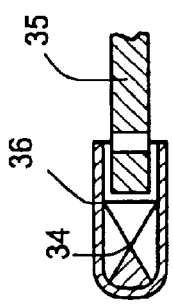
FIG. 8 is a cross-section of a coil winding, section of a tension bar and coil housing.

FIG. 2 shows an exemplary HTS racetrack field winding assembly 33 comprising a field coil winding 34 and a series of tension bars 35 (the coil support) extending between opposite sides of the winding. The winding assembly 33 is fabricated with the field winding 34 and tension bars 35 before the assembly 33 is inserted into the rotor core. The tension bars support the field coil windings with respect to the centrifugal forces that act on the windings as the rotor spins during operation. Accordingly, the tension bars are attached to the windings by a winding housing 36 (as shown in FIG. 8). The housing and tension bars restrain the expansion of the field coil winding 34 that would otherwise occur with the tension bars 35.

The SC field windings 34 of the rotor includes a high temperature superconducting (SC) winding 34. Each SC winding includes a high temperature superconducting conductor, such as a BSCCO ($Bi_xSr_xCa_xCu_xO_x$) conductor wires laminated in a solid epoxy impregnated winding composite. For example, a series of BSCCO 2223 wires may be laminated, bonded together and wound into a solid epoxy impregnated winding.

SC wire is brittle and easy to be damaged. The SC winding is typically layer wound SC tape that is epoxy impregnated. The SC tape is wrapped in a precision winding form to attain close dimensional tolerances. The tape is wound around in a helix to form the racetrack SC winding 34.

The dimensions of the racetrack winding are dependent on the dimensions of the rotor core. Generally, each racetrack SC winding encircles the magnetic poles of the rotor core, and is parallel to the rotor axis. The field windings are continuous around the racetrack. The SC windings form a resistance free electrical current path around the rotor core and between the magnetic poles of the core. The winding has electrical contacts 41 that electrically connect the winding to the collector 31.

Fluid passages 38 for cryogenic cooling fluid are included in the field winding 34. These passages may extend around an outside edge of the SC winding 34. The passageways provide cryogenic cooling fluid to the porous winding and remove heat from the winding. The cooling fluid maintains the low temperatures, e.g., 27° K, in the SC field winding needed to promote superconducting conditions, including the absence of electrical resistance in the winding. The cooling passages have an input and output fluid ports 39 at one end of the rotor core. These fluid (gas) ports 39 connect the cooling passages 38 on the SC winding to the cryogen transfer coupling 26.

Each HTS racetrack field winding 34 has a pair of generally straight side portions 40 parallel to a rotor axis 20, and a pair of end portions 42 that are perpendicular to the rotor axis. The side portions of the field coil winding are subjected to the greatest centrifugal stresses. Accordingly, the side portions are supported by the tension bars and housing. These bars and housing form a winding support system that counteract the centrifugal forces that act on the winding.

Figure 3:
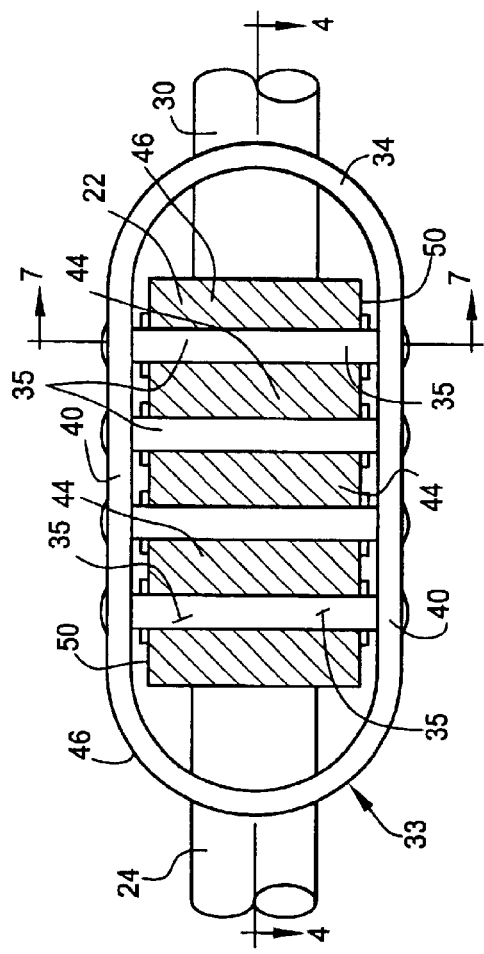
FIG. 3 is a cross-sectional view of an assembled rotor core with a coil winding.
Figure 4:
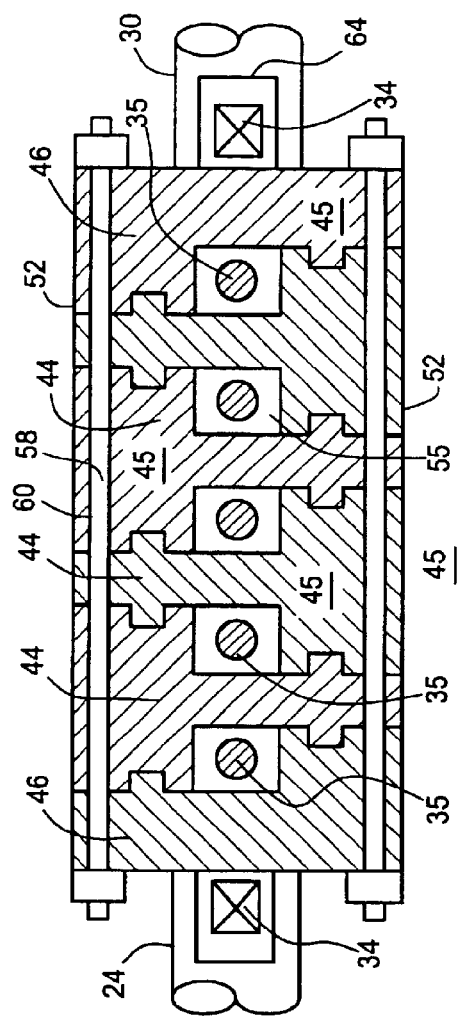
FIG. 4 is a cross-sectional diagram of the assembled rotor core taken along line 4—4 in FIG. 3.
Figure 7:
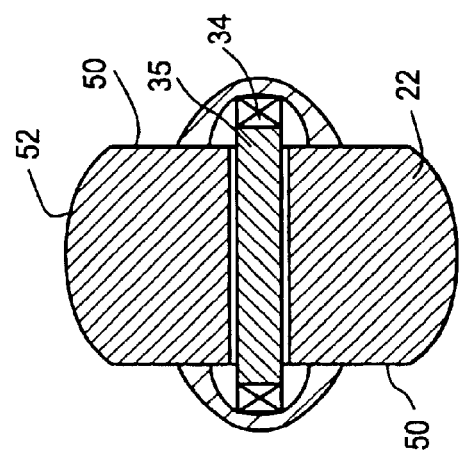
FIG. 7 is a cross section of the rotor core taken along line 7—7 of FIG. 3.

FIG. 3 is a schematic diagram of a multi-piece rotor core 22 with the winding assembly 33, including the racetrack superconducting coil field winding 34 and tension bars 35. The iron core is made of multiple core sections, which are generally several middle sections 44 and a pair of end sections 46. Each of the core sections have a semi-rectangular shape (see FIG. 7) with a pair of opposite flat sides 50 and a pair of opposite arc-shaped sides 52.

Figure 6:
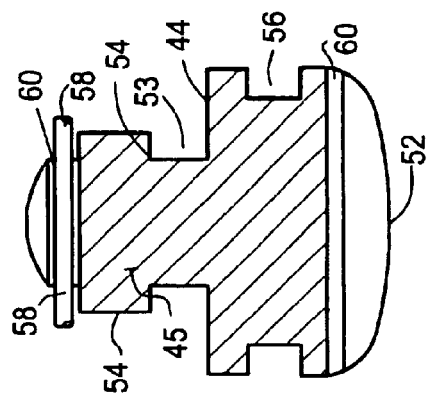
FIG. 6 is a cross-sectional diagram of a rotor core section.
Figure 5:
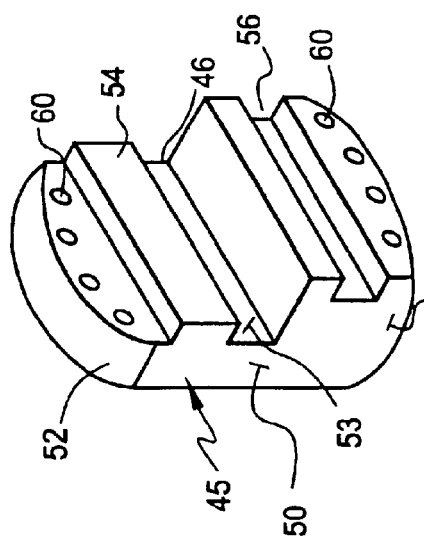
FIG. 5 is a perspective diagram of a rotor core end section.

When assembled, the flat sides 50 of the core sections are in alignment with each other, and similarly the arc-shaped sides are also in alignment. The middle core sections 44 have a generally "T" shape in cross sections, except for the two end sections (compare FIGS. 5 and 6). The end sections 46 have a generally L-shaped cross section.

The sections of the rotor core are assembled around the winding assembly 33. During assembly of the core, the narrow head 45 of each middle section slides between adjacent support bars 35 in the winding assembly. The narrow head of the end rotor core sections 46 slide between a tension bar 35 and an end 42 of the coil winding 34. Each of the core sections has at least one tension rod slot 53 (middle sections 44 have a pair of opposite slots) which when mated with the slot in an opposite core forms an aperture 55 for a tension bar 35. The assembly of rotor core sections permits integrating a fully assembled winding assembly 33 (which includes, for example, field winding 34 and tension bars 35) into the rotor core.

The core sections 44, 46 may be iron core forgings. The rotor core sections are assembled through rabbit fits for concentricity and alignment. Each core section has at least one boss 54 (middle sections have a pair of opposing bosses) that fit into a slot 56 on an adjacent core section. The boss-slot connection between the core sections aligns the core sections in the rotor core. Several tie-rods 58 extend laterally through rod holes 60 along the length of the rotor core. The tie rods have a nut or other faster at each end and hold the core sections together in compression.

A vacuum housing 64 may be formed over the field winding 34, once the rotor core sections have been assembled around the winding assembly. A vacuum around the winding facilitates the superconducting characteristics of the winding. The vacuum housing provides a vacuum over the entire race-track shape of the coil winding.

While the invention has been described in connection with what is presently considered to be the most practical and preferred embodiment, it is to be understood that the invention is not to be limited to the disclosed embodiment, but on the contrary, is intended to cover all embodiments within the spirit of the appended claims.

What is claimed is:

1. A rotor in a synchronous machine comprising:
  a superconducting field winding assembly having a coil winding and at least one winding support extending between opposite sides of the winding, wherein opposite ends of said winding support attach to the coil winding, and
  a rotor core formed of a plurality of rotor core sections arranged along a rotational axis of the core, each of said core sections having a slot to receive said winding support, wherein said winding support extends between opposite slots of adjacent core sections and a gap exists between the winding support and said opposite slots.

2. In a rotor as in claim 1 wherein said plurality of rotor core sections are coaxial with a rotational axis of said rotor core.

3. In a rotor as in claim 1 wherein said rotor core sections include opposite end core sections and at least one middle core section, wherein said end core sections are at opposite ends of the core, wherein said ends are arranged alone a rotational axis of the core.

4. In a rotor as in claim 1 wherein said winding support further comprising at least one tie rod extending through said slots in the plurality of rotor core sections and securing said core sections together wherein said tie rod is separated from the slots in the core sections by the gap, and opposite ends of the tie rod attach to the coil winding.

5. In a rotor as in claim 1 further comprising a vacuum housing over said field coil winding.

6. In a rotor as in claim 1 wherein said core sections are iron.

7. In a rotor as in claim 1 wherein said core sections are iron forgings.

8. In a rotor in a synchronous machine, comprising:
  a superconducting field winding assembly having a coil winding and at least one winding support extending between opposite sides of the winding, and
  a rotor core formed of a plurality of rotor core sections, each of said core sections having a slot to receive said winding support, and
  wherein said end core sections have a generally L-shaped cross section, and said at least one middle core section has a generally T-shaped cross section.

9. In a rotor in a synchronous machine, comprising:
  a superconducting field winding assembly having a coil winding and at least one winding support extending between opposite sides of the winding, and
  a rotor core formed of a plurality of rotor core sections, each of said core sections having a slot to receive said winding support, and
  wherein at least one middle core section has a cross-sectional shape with a narrow head, where the head fits between a pair of bars of said winding supports.

10. In a rotor in a synchronous machine, comprising:
  a superconducting field winding assembly having a coil winding and at least one winding support extending between opposite sides of the winding, and
  a rotor core formed of a plurality of rotor core sections, each of said core sections having a slot to receive said winding support, and
  wherein the at least one rotor core section has a wide region separated from the narrow head by a slot for the winding support.

11. A rotor in a synchronous machine, comprising:
  a superconducting field winding assembly having a coil winding and at least one winding support extending between opposite sides of the winding, wherein opposite ends of the winding support are attached to the opposite sides of the winding, and a rotor core formed of a plurality of rotor core sections, wherein said core sections are oriented generally perpendicularly to a rotational axis of the rotor core and each of said core sections having a slot to receive said winding support.

12. In a rotor as in claim 11 wherein the slot in each core section is parallel to a plane of the winding.

13. In a rotor as in claim 11 wherein said rotor core sections include opposite end core sections and at least one middle core section.

14. In a rotor as in claim 11 further comprising at least one tie rod extending through said plurality of rotor core sections and securing said core sections together and said tie rod being substantially perpendicular to said winding support, wherein opposite ends of said tie rod attach to the opposite sides of the winding.

15. In a rotor as in claim 11 further comprising a vacuum housing over said field coil winding.

16. In a rotor as in claim 11 wherein said core sections are iron.

17. In a rotor as in claim 11 wherein said core sections are iron forgings.

18. In a rotor in a synchronous machine, comprising:

a superconducting field winding assembly having a coil winding and at least one winding support extending between opposite sides of the winding, wherein opposite ends of the winding support are attached to the opposite sides of the winding, and a rotor core formed of a plurality of rotor core sections, each of said core sections having a slot to receive said winding support, and wherein said rotor core sections include opposite end core sections and at least one middle core section, and said end core sections have a generally L-shaped cross section, and said at least one middle core section has a generally T-shaped cross section.

19. In a rotor in a synchronous machine, comprising:

a superconducting field winding assembly having a coil winding and at least one winding support extending between opposite sides of the winding, wherein opposite ends of the winding support are attached to the opposite sides of the winding, and a rotor core fanned of a plurality of rotor core sections, each of said core sections having a slot to receive said winding support, and wherein said rotor core sections include opposite end core sections and at least one middle core section, and at least one middle core section has a cross-sectional shape with a narrow head, wherein the head fits between a pair of bars of said winding supports.

20. In a rotor in a synchronous machine, comprising:

a superconducting field winding assembly having a coil winding and at least one winding support extending between opposite sides of the winding, wherein opposite ends of the winding support are attached to the opposite sides of the winding, and a rotor core formed of a plurality of rotor core sections, each of said core sections having a slot to receive said winding support, and wherein the at least one rotor core section has a wide region separated from the narrow head by the slot for the winding support.

21. In a rotor in a synchronous machine, comprising:

a superconducting field winding assembly having a coil winding and at least one winding support extending between opposite sides of the winding, wherein opposite ends of the winding support are attached to the opposite sides of the winding, and a rotor core formed of a plurality of rotor core sections having a substantially circular perimeter, each of said core sections having a slot extending across a face of the core section to another side, and an aperture formed between opposite slots of adjacent core sections, wherein said channel is formed around said winding support as the core sections are assembled.

22. A rotor as in claim 21 further wherein said rotor core sections include opposite end core sections and at least one middle core section, and said end core sections have a generally L-shaped cross section, and said at least one middle core section has a generally T-shaped cross section.

23. A rotor as in claim 21 wherein the winding support is a rod having opposite ends each attachable one of the opposite sides of the winding.

24. A rotor as in claim 21 wherein said plurality of rotor core sections are coaxial with a rotational axis of said rotor core and are substantially perpendicular to said a rotational axis.

25. A rotor as in claim 21 wherein said rotor core sections include opposite end core sections and at least one middle core section, wherein said end core sections are at opposite ends of the core along a rotational axis of the core.

26. A rotor in a synchronous machine comprising:

a superconducting field winding assembly having a coil winding and at least one winding support extending between opposite sides of the winding, wherein opposite ends of said winding support attach to the coil winding, and a rotor core formed of a plurality of rotor core sections, each of said core sections having a slot to receive said winding support, wherein said core sections are oriented generally perpendicularly to a rotational axis of the rotor core and wherein said winding support extends through an aperture defined by opposite slots of adjacent core sections.

27. A rotor as in claim 26 wherein said rotor core sections include opposite end core sections and at least one middle core section, and said end core sections have a generally L-shaped cross section, and said at least one middle core section has a generally T-shaped cross section.

28. A rotor as in claim 26 wherein said rotor core sections have a substantially circular perimeter.

29. A rotor as in claim 26 wherein the winding support is a rod having opposite ends each attachable one of the opposite sides of the winding.

30. A rotor as in claim 26 wherein said plurality of rotor core sections are coaxial with the rotational axis of said rotor core.

31. A rotor as in claim 26 wherein said rotor core sections include opposite end core sections and at least one middle core section, wherein said end core sections are at opposite axial ends of core.

32. A rotor as in claim 26 further comprising a gap between the winding and the opposite slots.

* * * * *

UNITED STATES PATENT AND TRADEMARK OFFICE
CERTIFICATE OF CORRECTION

PATENT NO. : 6,795,720 B2
DATED : September 21, 2004
INVENTOR(S) : Yu Wang

It is certified that error appears in the above-identified patent and that said Letters Patent is hereby corrected as shown below:

Column 6,
Line 20, delete "alone" and insert -- along --

Column 7,
Line 47, delete "fanned" and insert -- formed --

Column 8,
Line 63, after the word "of" insert -- the --
Line 65, after the word "winding" insert -- support --

Signed and Sealed this

Twenty-ninth Day of March, 2005

JON W. DUDAS
*Director of the United States Patent and Trademark Office*